(12) United States Patent
White

(10) Patent No.: US 11,481,845 B2
(45) Date of Patent: Oct. 25, 2022

(54) SYSTEM AND METHOD OF QUOTING AVIATION INSURANCE FROM MULTIPLE INSURANCE VENDORS

(71) Applicant: Matthew R. White, Corona, CA (US)

(72) Inventor: Matthew R. White, Corona, CA (US)

( * ) Notice: Subject to any disclaimer, the term of this patent is extended or adjusted under 35 U.S.C. 154(b) by 484 days.

(21) Appl. No.: 16/265,306

(22) Filed: Feb. 1, 2019

(65) Prior Publication Data

US 2019/0205989 A1 Jul. 4, 2019

Related U.S. Application Data

(63) Continuation of application No. 16/052,593, filed on Aug. 1, 2018, now abandoned.

(60) Provisional application No. 62/540,389, filed on Aug. 2, 2017.

(51) Int. Cl.
*G06Q 40/08* (2012.01)
*G06F 3/04842* (2022.01)
*G06F 40/154* (2020.01)

(52) U.S. Cl.
CPC ......... *G06Q 40/08* (2013.01); *G06F 3/04842* (2013.01); *G06F 40/154* (2020.01)

(58) Field of Classification Search
CPC ............................. G06Q 40/08; G06F 3/04842
See application file for complete search history.

(56) References Cited

U.S. PATENT DOCUMENTS

| | | | |
|---|---|---|---|
| 7,343,309 B2 | 3/2008 | Ogawa et al. | |
| 7,725,358 B1 | 5/2010 | Brown et al. | |
| 8,799,125 B2 | 8/2014 | Schumann, Jr. | |
| 2001/0023404 A1* | 9/2001 | Ogawa | G06Q 40/02 705/4 |
| 2008/0221936 A1* | 9/2008 | Patterson | G06Q 10/10 705/4 |
| 2013/0110560 A1 | 5/2013 | Syed et al. | |
| 2014/0172681 A1* | 6/2014 | Lamp | G06Q 40/025 705/38 |

(Continued)

OTHER PUBLICATIONS

XL Catlin, "XL Catlin enhances aviation insurance online platform with new servicing options for P&B aviation clients in US," published at https://xlcatlin.com/insurance/news/vbbindspeed-platform-enhancements, Feb. 5, 2018, pages.

*Primary Examiner* — Bennett M Sigmond
*Assistant Examiner* — Xavier M. Bennett
(74) *Attorney, Agent, or Firm* — Christopher Mayle; Bold IP, PLLC

(57) ABSTRACT

The present invention relates to a method, a system, and the associated software. With respect to the method, it is best characterized as a method of providing a user with an estimate of an aviation insurance premium from one or more vendors. The method may include receiving an aircraft identification input, transmitting user input information to one or more aviation insurance vendors, and displaying received aviation insurance premium estimates from one or more vendors. The system is best characterized as a system for administering aviation insurance estimates. In order to accomplish desired objectives, the system employs certain associated software to allow users to receive multiple aviation insurance premium quotes from one or more vendors.

7 Claims, 10 Drawing Sheets

(56) References Cited

U.S. PATENT DOCUMENTS

| | | | |
|---|---|---|---|
| 2015/0325064 A1* | 11/2015 | Downey | G07C 5/004 701/29.3 |
| 2016/0063638 A1* | 3/2016 | Brantley | G06Q 40/08 705/4 |
| 2016/0203506 A1* | 7/2016 | Butler, IV | G06Q 30/0222 705/14.23 |

* cited by examiner

SYSTEM AND METHOD OF QUOTING AVIATION INSURANCE FROM MULTIPLE INSURANCE VENDORS

CROSS-REFERENCE TO RELATED APPLICATIONS

This application is a continuation of U.S. patent application Ser. No. 16/052,593, filed Aug. 1, 2018, which claims priority to U.S. Provisional Application No. 62/540,389 filed Aug. 2, 2017, which is incorporated by reference in its entirety.

FIELD OF THE DISCLOSURE

This disclosure relates generally to the field of aviation insurance, and more particularly, to a method and system which permits prospective aviation insurance buyers to obtain premium quotes from multiple insurance vendors that can be easily compared with minimum user supplied information.

BACKGROUND

Even with modern technology and advancements with data storage and the internet, it remains relatively difficult to obtain and compare quotes for aviation insurance products. In order to receive quotes for their client, current aviation insurance brokers have to manually submit a quote request to each insurance company individually. Typically, to receive aviation quotes for their clients, aviation brokers must use aviation insurance systems that are dedicated PC programs that must be installed on an aviation broker's local computer. While using these programs, the aviation brokers must supply very detailed information about an aircraft and pilot to each aviation insurance vendor that they wish to receive a quote from. Therefore, an aviation broker must spend a significant amount of time and effort on receiving an aviation quote from each vendor and must enter a significant amount of information to receive said quotes.

There have been some attempts to provide alternatives. For example, U.S. Pat. No. 7,343,309 discloses a method for providing a user with an estimate of an insurance premium for an insurance product from at least one insurance vendor by completing the steps of having the consumer input the data necessary to receive the quotes, having the service provider convert the inputs into a common format and embed a website address to the insurance companies, sending the common format info and embed insurance web address back to the user before sending the information to the selected insurance vendor directly from the user, and finally sending the insurance quotes back to the user from the insurance vendor.

Although this patent attempts to describe receiving an insurance quote from multiple vendors, the patent still includes several disadvantages of the conventional insurance systems. More specifically, this patent fails to in include an adequate system or method that can allow a broker to receive aviation insurance quotes from multiple vendors using a minimum amount of user input.

Thus, a way to quickly send an aviation insurance quote request to multiple vendors of aviation insurance products using a minimum amount of user input is desired and would save a significant amount of time and effort during the aviation insurance quoting process.

The disclosed system and method is directed to overcoming one or more of the problems set forth above.

SUMMARY

The disclosure presented herein relates to a method, system, or computer program product. More specifically, a method, system, or computer product for providing a user with an estimate of an aviation insurance premium from one or more vendors. The method includes receiving the aircraft identification input at the service server, initiating a third-party information request to a national aviation authority for aircraft data, and transmitting a request for an insurance aviation insurance premium estimate to one or more aviation insurance vendors. The system includes one or more processors and a memory coupled to the one or more processors, with program instructions on the memory to administer an aviation insurance estimate.

In some embodiments, the preceding and following embodiments and descriptions are for illustrative purposes only and are not intended to limit the scope of this disclosure. Other aspects and advantages of this disclosure will become apparent from the following detailed description.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

Definitions

Memory refers to a computer memory, which is any physical device capable of storing information temporally or permanently. For example, Random Access memory (RAM), is a volatile memory that stores information on an integrated circuit used by the operating system, software, and hardware.

A server is a computer that provides data to other computers. It may serve data to systems on a local area network (LAN) or a wide area network (WAN) over the Internet.

A local area network may serve as few as two or three users (for example, in a small-office network) or several hundred users in a larger office. LAN networking comprises cables, switches, routers, and other components that let users connect to internal servers, websites, and other LANs via wide area networks.

A wide area network (WAN) is a geographically distributed private telecommunications network that interconnects multiple local area networks (LANs).

Wi-Fi is the standard wireless local area network (WLAN) technology for connecting computers and myriad electronic devices to each other and to the Internet. Wi-Fi is the wireless version of a wired Ethernet network, and it is commonly deployed alongside ethernet.

A database (DB) is an electronic filing system, generally in a computer. A collection of information (usually as a group of linked data files) organized in such a way that a program can quickly select pieces of data.

A computer network ("network") is a group of computer systems and other computing hardware devices that are linked together through communication channels to facilitate communication and resource-sharing among a wide range of users A computing device is any electronic equipment controlled by a CPU (Central processing Unit), including desktop and laptop computers, smartphones, and tablets. It usually refers to a general-purpose device that can accept software for many purposes in contrast with a dedicated unit of equipment such as a network switch or router.

An aviation insurance broker or insurance agent is a person or firm independent of any insurance company, who acts as an intermediary in bringing together clients seeking aviation or aircraft insurance cover and insurance companies offering suitable aviation insurance policies.

An aviation insurance premium is the amount of money that an individual or business must pay for an aviation insurance policy. The aviation insurance premium is income for the insurance company, once it is earned, and also represents a liability in that the insurer must provide coverage for claims being made against the policy.

A national aviation authority (NAA) or civil aviation authority is a government statutory authority in each country that maintains an aircraft register and oversees the approval and regulation of civil aviation.

The Federal Aviation Administration (FAA) of the United States is a national authority with powers to regulate all aspects of civil aviation. These include the construction and operation of airports, air traffic management, the certification of personnel and aircraft, and the protection of U.S. assets during the launch or re-entry of commercial space vehicles.

The registration number is commonly referred to as an N number, because all aircraft registered there have a number starting with the letter N. An alphanumeric system is used because of the large numbers of aircraft registered in the United States. An N-number begins with a run of one or more numeric digits, may end with one or two alphabetic letters, may only consist of one to five characters in total, and must start with a digit other than zero.

In computing, Extensible Markup Language (XML) is a markup language that defines a set of rules for encoding documents in a format that is both human-readable and machine-readable.

BRIEF DESCRIPTION OF THE DRAWINGS

The preceding and following embodiments and descriptions are for illustrative purposes only and are not intended to limit the scope of this disclosure. Other aspects and advantages of this disclosure will become apparent from the following detailed description.

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
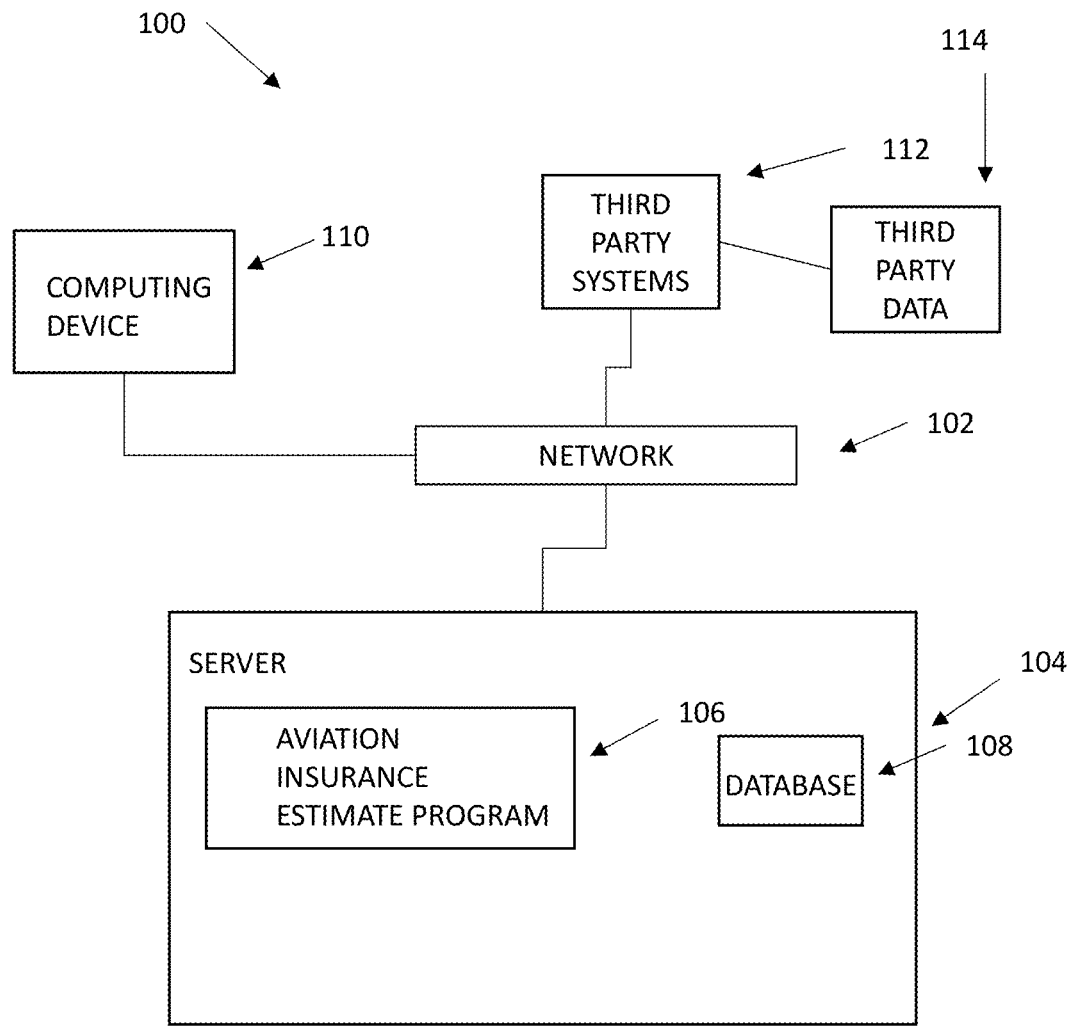
FIG. 1 depicts a block diagram depicting a computing environment, in accordance with one embodiment of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "frame," or "system." Furthermore, aspects of the present invention may take the form of a computer program product embodied in one or more computer readable medium(s) having computer readable program code/instructions embodied thereon.

Embodiments of the present invention are related to providing a user with an aviation insurance premium estimate from one or more insurance vendors. The process of receiving an aviation insurance premium estimate involves a myriad of business tasks including but not limited to receiving the aircraft identification input from the users, initiating a third-party information request to a national aviation authority for aircraft data, transmitting to one or more selected aviation insurance vendor's servers a request for an aviation insurance premium estimate, and displaying the received aviation insurance estimates.

Typically, communication between brokers and aviation insurance vendors is conducted in a manner utilizing telephones, facsimile, email, and dedicated computer programs that are installed and operated on the brokers personal computer. These conventional methods, however, tend to be redundant, time consuming, error-prone, and overall inefficient. What is needed is an online method and system for connecting these parties and providing a central location to communicate. In addition, the current aviation insurance premium estimate process may be difficult as the broker must enter in the same client, aircraft, and pilot information for each insurance vendor from which they wish to receive an estimate. Additionally, the current process requires the broker to enter in large amounts of redundant information pertaining to the aircraft desired to be insured.

In one aspect, the present disclosure is directed to a method for providing a user with an aviation insurance premium estimate. The method may include a program configured to retrieve and transfer information about a specific aircraft from a national aviation authority. In another aspect, the present disclosure is directed to a system for administrating an insurance premium estimate. The system may include receiving an aircraft identification input, an aircraft identification and aircraft data retrieval process, and a transmitting process.

The method of providing a user with an aviation insurance premium estimate includes an aircraft data retrieving process, where a user will be able to enter in aircraft identification information, and the program will retrieve aircraft data from a national aviation authority and prefill the condition inputs for the aviation insurance premium estimate request. A program provides the aviation premium estimate condition input screens, initiates the third-party information request, transmits the retrieved data back to the user's condition input screen, and provides the user the aviation insurance premium estimates from one or more insurance vendors.

One object of the present invention is to provide centralized administration of aviation insurance premium estimates that are globally accessible by users. The advantage of this object is a decrease in paper handling, redundancy, inaccuracy, and general inefficiency associated with more conventional modes of communication. Another object of the present invention is to provide a more efficient system for prefilling aircraft data that a user is required to supply and minimizing the amount of information a user must input in order to receive aviation insurance premium estimates. The advantage of this object is a reduction in the amount of time which transpires between the time a user requests an aviation insurance premium estimate and the user receives one or more estimates on an aviation insurance product.

To meet these and other objects and advantages of the present invention, preferred and alternate embodiments of an online method and system for providing an aviation insurance premium estimate are provided. The present invention will now be described in detail with reference to the Figures.

FIG. 1 depicts a block diagram of a computing environment 100 in accordance with one embodiment of the present invention. FIG. 1 provides an illustration of one embodiment and does not imply any limitations regarding the environment in which different embodiments may be implemented. In the depicted embodiment, computing environment 100 includes a network 102, a service server 104, an aviation insurance estimate program 106, a database 108, a computing device 110, a third-party systems 112, and a third-party data 114. As depicted, computing environment 100 provides an environment for the aviation insurance estimate program 106 and database 108 to access content created on computing device 110 through network 102. Computing environment 100 may include additional servers, computers, or other devices not shown.

Network 102 may be a local area network (LAN), a wide area network (WAN) such as the Internet, any combination thereof, or any combination of connections and protocols that may support communications between service server 104 and computing device 110 in accordance with embodiments of the invention. Network 102 may include wired, wireless, or fiber optic connections.

Service server 104 may be a management server, a web server, or any other electronic device or computing system capable of processing program instructions and receiving and sending data. In some embodiments, service server 104 may be a laptop computer, tablet computer, netbook computer, personal computer (PC), a desktop computer, or any programmable electronic device capable of communicating with computing device 110 via network 102. In other embodiments, service server 104 may represent a server computing system utilizing multiple computers as a server system, such as in a cloud computing environment. In another embodiment, server 104 represents a computing system utilizing clustered computers and components to act as a single pool of seamless resources. In some embodiments, the creator of the content may provide all the potential options on service server 104. In the depicted embodiment, service server 104 includes aviation insurance estimate program 106 and database 108. In other embodiments, service server 104 may include any combination of aviation insurance estimate program 106 and database 108.

Aviation insurance estimate program 106 operates to provide a system and method to provide a user an aviation insurance premium estimate from one or more aviation insurance vendors. Aviation insurance estimate program 106 receives the aircraft identification input, initiates a third-party information request to a national aviation authority, transmits a request for an aviation insurance premium estimate to one or more aviation insurance vendors, and provides the user with aviation insurance premium estimates. In the depicted embodiment, aviation insurance estimate program 106 resides on service server 104 with database 108 and utilizes network 102 for computing device 110 to access the content. In some embodiments, aviation insurance estimate program 106 resides on computing device 110. In other embodiments, aviation insurance estimate program 106 may be located on another server or computing device, provided aviation insurance estimate program 106 has access to database 108 and computing device 110.

Database 108 may be a repository that may be written to and/or read by aviation insurance estimate program 106. Information gathered from aviation insurance estimate program 106 may be stored to database 108 as well as any analysis techniques, metadata, and additional data that aviation insurance estimate program 106 may be used to analyze, extract, create, and associate tags in content. In one embodiment, database 108 is a database management system (DBMS) used to allow the definition, creation, querying, update, and administration of a database(s). In the depicted embodiment, database 108 resides on service server 104. In other embodiments, database 108 resides on another server, or another computing device, as long as database 108 is accessible to aviation insurance estimate program 106.

The server 104 may also access third-party systems 112 and third-party data 114, through the network 102, which may include aircraft data, including make, model, and year as well as aircraft history.

Computing device 110 may be a management server, a web server, or any other electronic device or computing system capable of processing program instructions and receiving and sending data. In some embodiments, computing device 110 may be a laptop computer, tablet computer, netbook computer, personal computer (PC), a desktop computer, or any programmable electronic device capable of communicating with service server 104 via network 102. In other embodiments, computing device 110 may represent a server computing system utilizing multiple computers as a server system, such as in a cloud computing environment. In another embodiment, computing device 110 represents a computing system utilizing clustered computers and components to act as a single pool of seamless resources. In the depicted embodiment, computing device 110 communicates with aviation insurance estimate program 106 via network 102. In other embodiments, computing device 110 may include any combination of aviation insurance estimate program 106 and database 108.

Figure 2:
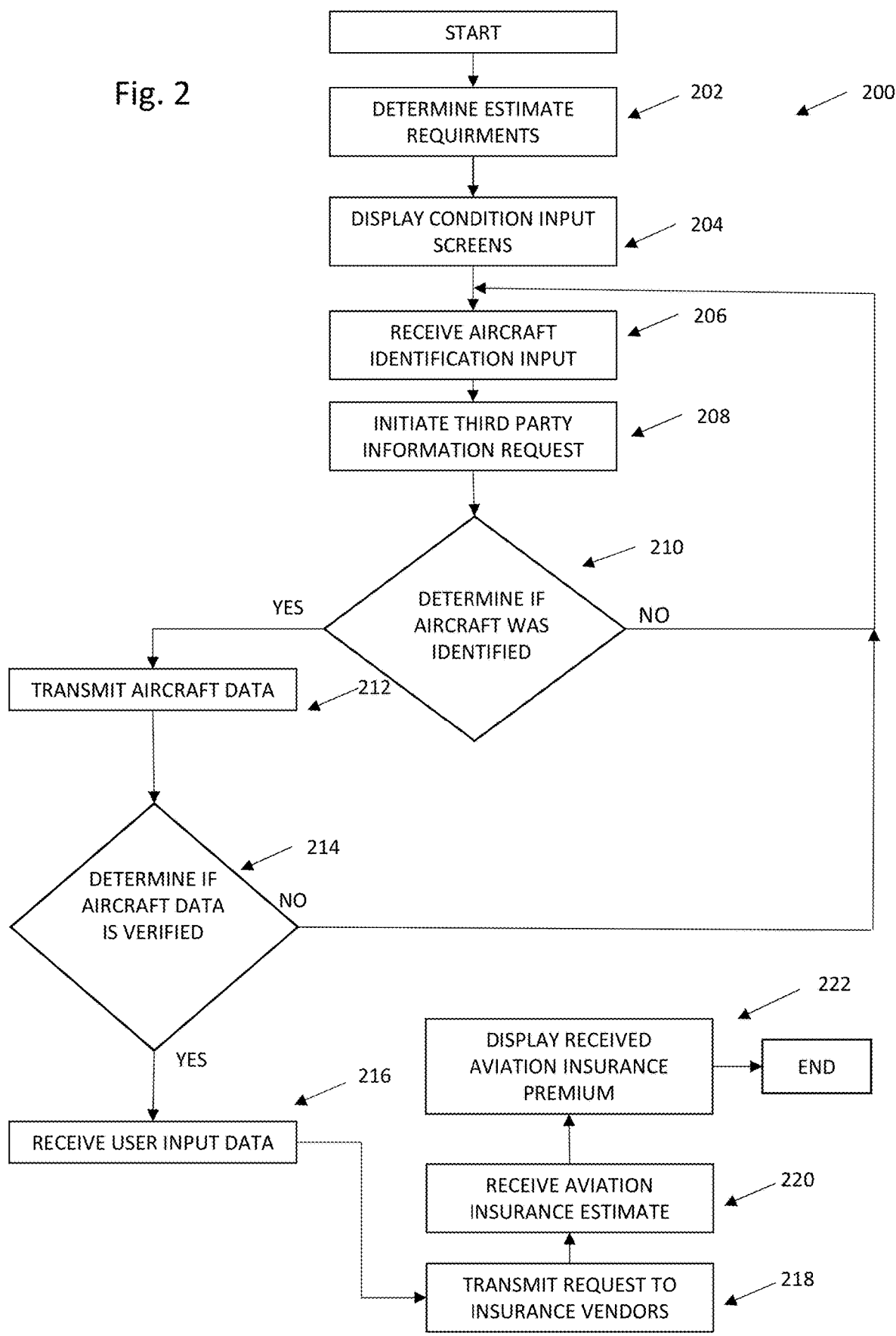
FIG. 2 depicts a flowchart of the operational steps taken by aviation insurance estimate program within computing environment 100 of FIG. 1, in accordance with an embodiment of the present invention.

FIG. 2 depicts a flowchart of the operational steps taken by aviation insurance estimate program 106 to receive aircraft identification input, initiate a third-party information request, and receive then display an aviation insurance premium estimate from one or more aviation insurance vendors, within computing environment 100 of FIG. 1, in accordance with an embodiment of the present invention. FIG. 2 provides an illustration of one embodiment and does not imply any limitations regarding computing environment 100 in which different embodiments may be implemented. Modifications to the depicted flowchart may be made.

In step 202, aviation insurance estimate program 106 determines the estimate requirements. On a personal computing device, or other computing device, the user can access the aircraft insurance estimate program through an internet browser or dedicated program software or application. After accessing the aviation insurance estimate program, a selectable input graphical user interface is presented to the user on the display unit of the computing device used by the user to access the program. The aviation insurance estimate program 106 determines estimate requirements by receiving an input selection from the user by asking the user to select, from one or more estimate entry selectable inputs, the most accurate estimate entry option. This input selection may be, but not limited to the type of insurance sought by the user, and whether the insurance sought is for pleasure or business, or whether the user desires a new quote or continue working on an estimate already in progress.

After the user enters in their desired insurance type and whether it is a new quote on the selectable input graphical interface, the user entered information is sent to the service server where the program 106 determines the estimate requirements. After the estimate requirements are determined, in one embodiment, the program determines which condition input screens are required in order to receive an aviation insurance estimate based off of the determined estimate requirements.

In step 204, aviation insurance program 106, after having determined the estimate requirements, display on the user's display unit of their computing device the selectable input graphical user interface. This selectable input graphical user interface, in some embodiments, includes one or more condition input screens. The selectable input graphical user interface includes one or more condition input screens, including an input screen for an aircraft identification input from the user.

In one embodiment, the program 106 will display to the user the selectable input graphical user interface that includes one or more condition input screens with multiple input options which the user can select to enter in the aircraft input. In one embodiment, the selection is made when the user enters in data in the corresponding input option or manually selecting said option. In this embodiment, these options can include entering an aircraft identification number, or N number, of a national aviation authority, selecting unknown aircraft identification number and manually inputting the aircraft year, make, and model, or importing an electronic spreadsheet that contains aircraft input data for the aircraft desired to be insured.

In step 206, the aviation insurance estimate program 106 receives an aircraft identification input. In one embodiment, the aircraft identification input can include entering the aircraft registration number, commonly referred to as an N number, other aircraft identification information if the N number is unknown, such as the aircraft's year, make, and model, or allow a user to import an electronic file that includes an electronic spreadsheet that has aircraft identifying information. If the user uploads an electronic file, such as a Microsoft® Excel file that contains the aircraft identifying information such as year, make, and model, the aviation insurance estimate program 106 will retrieve that aircraft identification input from said file.

In step 208, after the aviation insurance estimate program 106 receives an aircraft identification input from the user, the program will initiate a third-party information request to a national aviation authority for aircraft data for an aircraft associated with said aircraft identification input. The aircraft data can include an aircraft's year, make, and model, as well as an aircraft's registration information to ensure quick and accurate estimate submissions. The national aviation authority is a government statuary authority in each country that maintains an aircraft register and oversees the approval and regulation of civil aviation and includes the Federal Aviation Administration (FAA). In one embodiment, third-party information request includes retrieving aircraft data associated with the provided aircraft identification information from the FAA's database.

In one example, after the user enters the aircraft's N number, this information is sent back to the service server 104. From the service server 104, aviation insurance estimate program 106 initiates a third-party information request by connecting with third-party systems 112 to retrieve third-party data 114. In one embodiment, the third-party systems is a national aviation authority such as the FAA, and the third-party data is aircraft data, including an aircraft's N number, make, model, year, and registration number. For example, in one embodiment, if a user enters an aircraft's N number as the aircraft identification input and is seeking an aviation insurance estimate in the United States, the program will connect with the FAA's database to retrieve the aircraft year, make, and model for the provided N number. This retrieved aircraft data would then populate the remaining fields for said aircraft data on the condition input screen.

In another embodiment, if the user does not know an aircraft's registration number, or N number, the user can enter in the aircraft's year, make, and model, or as much of that information that is known. The program will initiate a third-party information request from the service server 104 to the third-party systems 112 listed above and retrieve the unknown aircraft data and populate the missing fields on the corresponding condition input screens.

In a further embodiment, if the user submits an electronic spreadsheet, including a Microsoft® Excel spreadsheet, the aviation insurance estimate program 106 will retrieve aircraft identification information from said spreadsheet including any recognized aircraft N number, year, make, or model. The program will initiate a third-party information request and send retrieved aircraft identification information from the service server 104 to the third-party systems 112 for aircraft data associated with said aircraft identification information. In one embodiment, identification information for multiple aircraft can be retrieved from said spreadsheet, and the program can initiate said third-party information request to correctly match the FAA database aircraft year, make, and model in order to make the estimate process quicker and more accurate for multiple or single aircraft requests.

The aviation insurance estimate program 106 may be in communication with one or more third-party systems 112 such as a federal, state, or municipal entity such as the Federal Aviation Authority (FAA) website, database, or third-party data 114 to retrieve aircraft data. This data may be used alone or combined with other third-party data or used with the assistance of a predictive model. The predictive model(s) of the present invention may include one or more neural networks, Bayesian networks (such as Hidden Markov models), expert systems, decision trees, collections of decision trees, support vector machines, or other systems known in the art for address problems with large numbers of variables. In some embodiments, the predictive models are trained on prior data and outcomes using a historical database of aviation insurance related data and resulting correlation relating to a same aircraft, different aircraft, or a combination of same and different aircraft.

In decision 210, the aviation insurance program 106 determines if the aircraft was identified. In some embodiments, the aircraft data must be retrieved from the third-party within a predetermined information tolerance, the information tolerance being a predetermined minimum amount of aircraft data retrieved from the national aviation authority database, to determine whether the aircraft has been successfully identified. In some embodiments, the program 106 needs to retrieve aircraft data associated with the make, year, and model if the aircraft's N number was supplied by the user in order to meet the minimum information tolerance for the YES BRANCH. In additional embodiments, the program 106 needs be able to retrieve the aircraft's registration information or N number if this information was not supplied by the user. If aircraft insurance estimate program 106 is able to retrieve enough aircraft data sufficient to meet the minimum information tolerance (YES BRANCH, proceed to step 212), the program 106 transmits the aircraft data. If aviation insurance estimate program 106 is unable to determine if the aircraft was identified (NO BRANCH, proceed to step 206), the program 106 attempts to collect more identifying information on the aircraft before performing step 208 again. In some non-limiting embodiments, if the program is unable to determine the aircraft or retrieve third-party aircraft data, the program 106 continues to step 216 asking the user to manually enter the aircraft data.

In step 212, the aircraft data received in response to the third-party information requests to said national aviation authority is transmitted from the service server 104 to the user, and specifically, transmitted to the corresponding condition input screens displayed on the user's computing device 110. In some embodiments, after the aircraft data is transmitted, the aircraft insurance estimate program 106 populates the corresponding condition input screens with the retrieved aircraft data. This is done in order to allow the user to enter in a minimum amount of information to allow for faster and simpler estimates on aircraft insurance. In some embodiments, the aircraft data is transmitted from the service server 104 to the corresponding condition input screens on the computing device 110 through the network 102.

In decision 214, aviation insurance estimate program 106 determines if the aircraft data transmitted to the user in step 212 is verified as correct by the user. In some embodiments, after the program populates the corresponding condition input screens with the retrieved aircraft data, determines that the aircraft was correctly identified, and aircraft data is verified, the aircraft insurance estimate program 106 moves onto the next step (YES BRANCH, proceed to step 216) and proceeds to enter in the user input data. If the aviation insurance estimate program 106 is unable to verify the aircraft data (NO BRANCH, proceed to step 206), the program 106 attempts to collect identification data on the aircraft. In some embodiments, the program would perform the aircraft identification input steps if the user deletes the data from the populated fields or if the user indicates on the selectable input graphical user interface that the populated fields of aircraft data retrieved and transmitted to the user in step 212 are not correct and do not correspond to the aircraft sought to be insured. In some embodiments, the program 106 allows the user to enter in aircraft data themselves into the corresponding condition input screens if the transmitted aircraft data is incorrect.

In Step 216, the aviation insurance program 106 receives, at the service server, user input data including general coverage information, user information, aircraft insurance information, pilot information, type of coverage sought, and one or more user selected aviation insurance vendors. In one embodiment, said user input data was entered in by the user onto the corresponding condition input screens. In some embodiments, this step is performed concurrently with step 214. In another embodiment, it is performed after step 214.

In one embodiment, the general coverage information can include aircraft insurance for traditional fixed wing aircraft, unmanned aerial vehicle (UAV) or drone aircraft, commercial/charter and private aircraft, helicopter, experimental aircraft, propeller or jet aircraft, or other flying machines or aviation aircraft. Additionally, the detailed coverage information can include the options of a new purchase of aviation insurance, or a renewal of an existing insurance policy. If the type of insurance sought is a renewal of an existing policy, or if the user currently has a policy they are looking to replace, the program 106 will allow the user to enter in the expiration date of their current policy.

In one embodiment, the detailed coverage information is used to determine the condition input screens displayed to the user. Setting forth or generating the condition input screens is the process of collecting information from the user and using that information to display to the user the correct one or more condition input screens for the type of aviation insurance sought. The estimate requirements may comprise selectable input(s) corresponding to said estimate requirements, the location of the insurance sought, the duration of the policy or coverage sought by the user, the above-mentioned type of aircraft insurance, the number of aircraft sought to be covered, or the like.

Further, the aviation insurance estimate program 106, in one embodiment, allows the user to enter in user information such as their first and last name, address, city, state, and zip code information. In this embodiment, this personal information, including the geographical location information such as the zip code or address, can be used by the program 106 to determine the estimate requirements, such as the vendors available in that region and policies that are available to the user. In one embodiment, the user information can include any information commonly collected about a user or company in order to give an insurance estimate.

The input data can also include aircraft insurance information. In one embodiment, a separate condition input screen is presented to the user after entering in their user information. The aircraft insurance information can include the tail number (or N number), the aircraft, year, make, model, hull coverage, aircraft modifications, home airport, or other information commonly collected for aircraft insurance. In one embodiment, much of the aircraft insurance information and aircraft data is pre-populated for the user in step 212, and the user only needs to fill out any missing fields.

Further, in one embodiment, the user input data can include pilot information. Pilot information is often required for an aviation insurance premium estimate, and in a non-limiting embodiment, the pilot information required to be entered in the one or more input screens by the user includes the pilot's first and last name, age, type of flight certificate held by the pilot, pilot ratings, pilot history of losses, waivers, and violations, total hours, retractable landing gear certified, multi-engine certified, tailwheel certified, and other information relevant for aviation insurance estimates.

In one embodiment, the program 106 can speed up pilot information entry and increase accuracy by using data from the FAA airmen database to populate license information, ratings information, and other pilot information for each pilot. In this embodiment, after a user populates a pilot's first, last name, and street address or city, the program 106 will search the FAA pilot database, or any pilot database, and display pilot data with matched information such as pilot license information, pilot ratings, pilot medical information and address information. The program 106 will then present the user a button to transfer this data instantly to the relevant fields within corresponding input screen, saving the user time, increasing information accuracy and making the quoting process faster.

After the pilot's information is entered, in one embodiment, the user can continue onto the next condition input screen to select the type of aviation insurance sought. The type of aviation insurance sought can include having the user verify and enter insurance liability coverage information. In one embodiment, this includes having the user select the liability and medical coverage sought by the user. In one embodiment, the policies and coverage options available to the user may be based on the user's geographic location entered in the steps above. In another embodiment, the user can select the coverage options available on a drop-down list on the corresponding condition input screen.

Additionally, in step 216, in one embodiment, the user is then asked to select from a list of insurance vendors that they desire to receive insurance quotes from. The list of available vendors can be any vendor that offers the desired aviation insurance product, and the list of available vendors can be altered by the insurance broker or agent. In one embodiment, the selectable graphical user interface has a select all button, wherein the select all button allows the user to select all available insurance vendors to request a quote from. In one embodiment, when the user selects the select all button, the quote estimates are immediately sent to the service server and to the insurance vendors. In a further embodiment, the user can submit to each desired insurance vendor individually.

In step 218, the aviation insurance estimate program 106 transmits the user's request for an insurance premium quote to the service server and then to each of the one or more user selected aviation insurance vendors. In one embodiment, the user's request for an insurance quote includes all of the user input data and retrieved third-party aircraft data outlined above. In another embodiment, once the user's request for an insurance premium quote is received at the service server, the program 106 takes the data received and converts it into XML data formatted for each insurance companies specific XML format and sends the data via XML securely to each selected insurance company's direct server. In another embodiment, the requested quote information is sent from the service server to the corresponding insurance vendor's servers via any electronic method commonly utilized in the insurance industry.

In step 220, aviation insurance estimate program 106 receives at the service server the aviation insurance premium estimate from the one or more selected aviation insurance vendors. In this embodiment, the insurance company's servers receive the data and insurance estimate requests, process the information, and return the information back to the service server via XML format and includes the following additional information: the premium, quote number, quoted status, and quote description. The insurance premium estimate, in one embodiment, can be comprised of any of the following commonly found in aviation insurance estimates: the aviation insurance premium, the aviation insurance quote, the status of the aviation insurance premium, and a description of the aviation insurance premium.

In step 222, the aviation insurance estimate program 106 displays onto the user's display unit the received aviation insurance premium estimates. In one embodiment, after the service server receives the aviation insurance estimates from the one or more selected aviation insurance vendors, the estimates are sent from the service server to the user's computer and displayed to the user. In one embodiment, the premium estimates can be displayed to the user in a PDF format. In another embodiment, the user can search, view, and enter the premium estimates. Additionally, in further embodiments, the user is able to purchase aviation insurance from the list of displayed insurance premium estimates, request further information, request to speak with an insurance broker or agent, request a new quote, save their insurance search, or other actions from the displayed premium estimate page.

Figure 3:
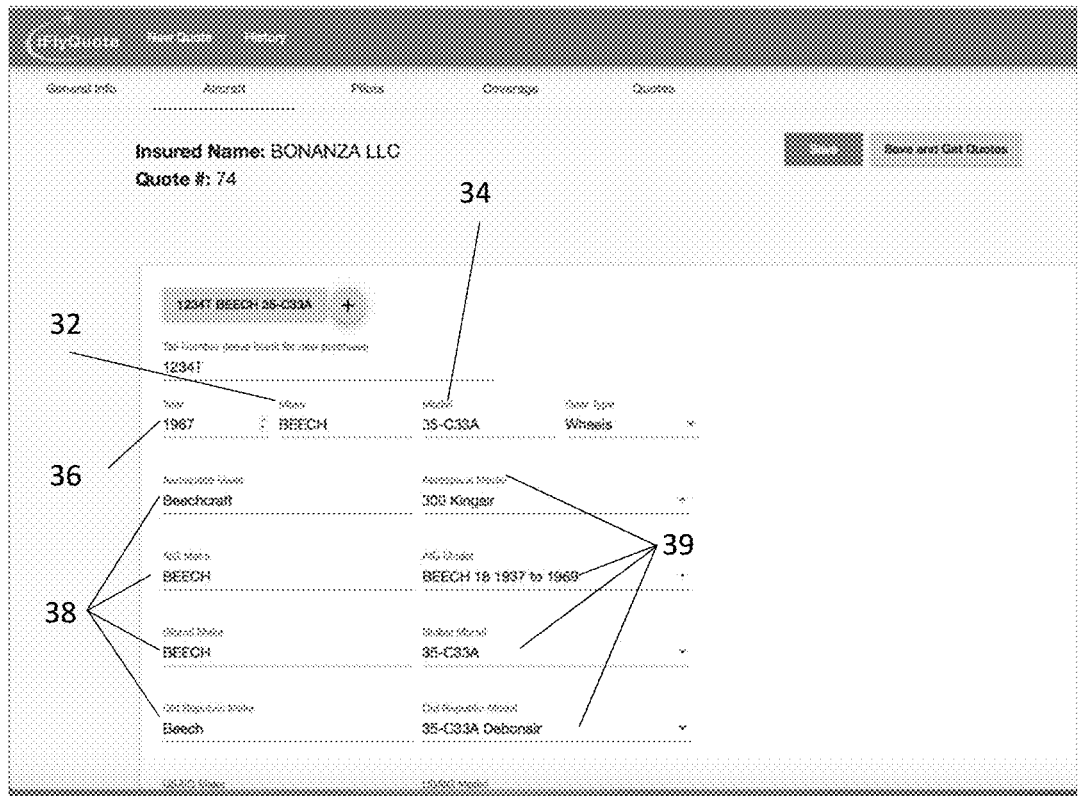
FIG. 3 is an example display screen showing an example of the aviation insurance estimate program's crowdsourcing function.

FIG. 3 is an example display screen showing an example of the aviation insurance estimate program's aircraft year 36, make 32, and model 34 crowdsourcing function used to speed up aircraft information entry and increase accuracy by using all of the present aviation insurance estimate program's 106 user insurance make 38/model 39 corrections and applying them to similar insurance make 38/model 39 selections. Many aviation insurance vendors have their own separate aircraft make and model list. This is shown, for example, in FIG. 3 how all of the listed insurance models 39 for each insurance vendor have a different model name for the same aircraft. Due to this, when a user is quoting for aviation insurance using traditional methods, that user has to manually select the aircraft insurance make and model for every vendor. The aviation insurance estimate program 106 has a Make/Model crowdsourcing feature that collects all users insurance make 38/model 39 selections across multiple brokerages for each aviation insurance vendor and if that specific aircraft make 32 or model 34, and in some embodiments year 36, is entered again into the program 106, the insurance makes 38 and models 39 will be pre-populated correctly saving the user time and increasing accuracy. In some embodiments, if the user selects one insurance make 38 or model 39, the program 106 uses the crowdsourcing feature to populate the remaining insurance makes 38 and models 39 for the other insurance vendors.

Figure 4:
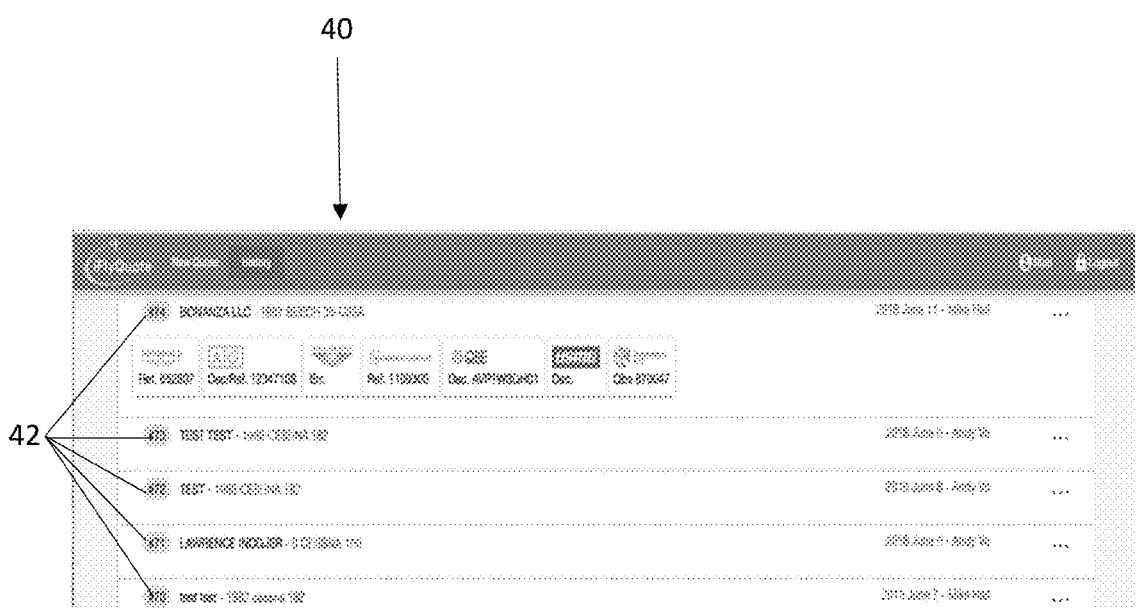
FIG. 4 is an example display screen showing an example of the aviation insurance estimate program's live quote updating functionality.

FIG. 4 is an example display screen showing an example of the aviation insurance estimate program's live quote updating functionality. After a quote request is submitted to an insurance company in step 218 above, if the insurance company automatically quotes the submission, a premium, quote control number 42 and actual PDF quote are returned to the users display of received aviation insurance estimates page. If the estimate request s unable to be instantly quoted and referred to an underwriter for manual review, once that request has been looked at and quoted, with the program's 106 live quote updating functionality, the insurance vendor's server will notify the service server, and the service server will then retrieve the PDF and premium estimate from the insurance vendor's server, displaying it in real time on the quote and history page.

Figure 5:
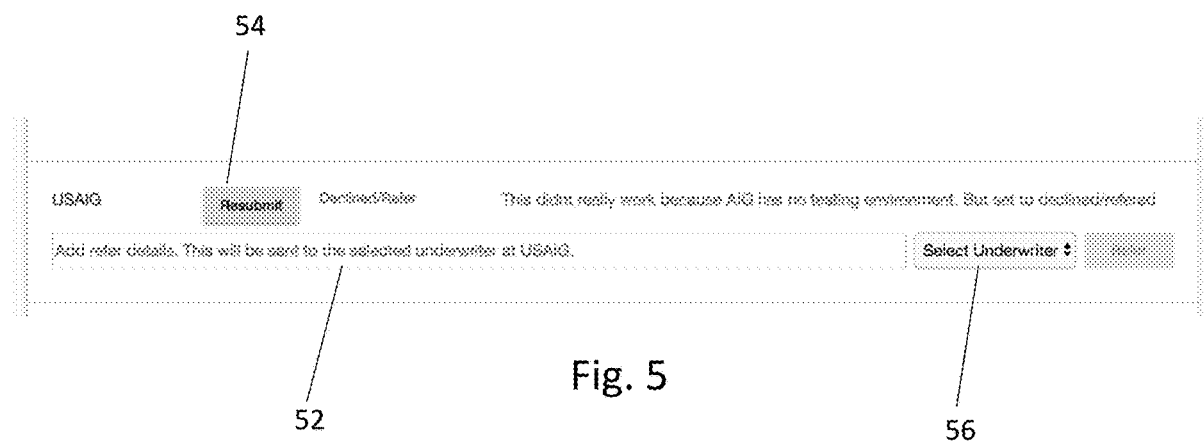
FIG. 5 is an example display screen showing an example of the aviation insurance estimate program's built-in insurance company referral buttons.

FIG. 5 is an example display screen showing an example of the aviation insurance estimate program's built-in insurance company referral buttons. These built-in buttons appear on the user's selectable graphical user interface and are used to refer quotes with messages directly to underwriters at insurance vendors for review without leaving the program's 106 interface. If quote requests sent to insurance vendors are not automatically quoted and returned a premium estimate and PDF in steps 218-222 above, the program 106 displays to the user-built fields 52, buttons 54, and a functionality that refers the quote directly to an underwriter 56 at a specified insurance vendor without the user having to log into an insurance vendors website and perform this task.

FIGS. 6-10 are example display screens showing examples of the steps taken for a method of quoting multiple submissions for drone/UAS (Unmanned Aircraft System) quoting functionality of the aviation insurance estimate program 106. Using a similar format as multiple aircraft submissions for quoting shown with steps 202-222 above, the program's 106 functionality for multiple submission drone/UAS quoting works in similar way but is designed and formatted for the information specific to drones and UAV's.

Figure 6:
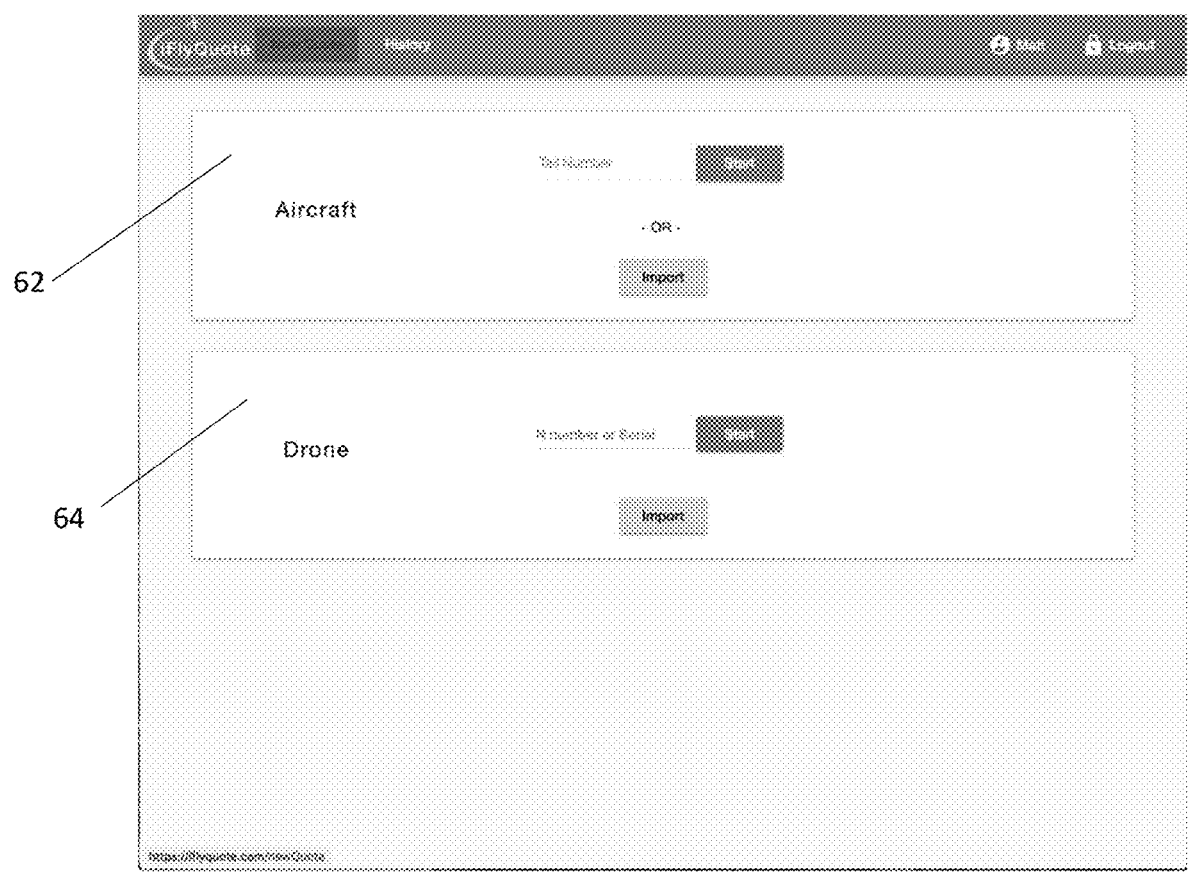
FIG. 6 is an example display screens showing an example of a method of multiple submissions for drone/UAS estimates.

In the FIG. 6 embodiment, steps 202-204 in quoting multiple drone/UAS submissions requires the user to determine the estimate requirements and display the condition input screens by deciding to receive an aircraft 62 or drone/UAS 64 insurance estimate. The user starts the UAV/drone estimate method by entering in the N number or serial number of the drone into the drone/UAS field 64 (step 206). In this embodiment, the program 106 utilizes the same method as listed in the steps above, including FAA integration to pre-owner name and address information populate year, make, and model of the drone, and verification of such information and transmitting to the user (steps 208-212).

Figure 7:
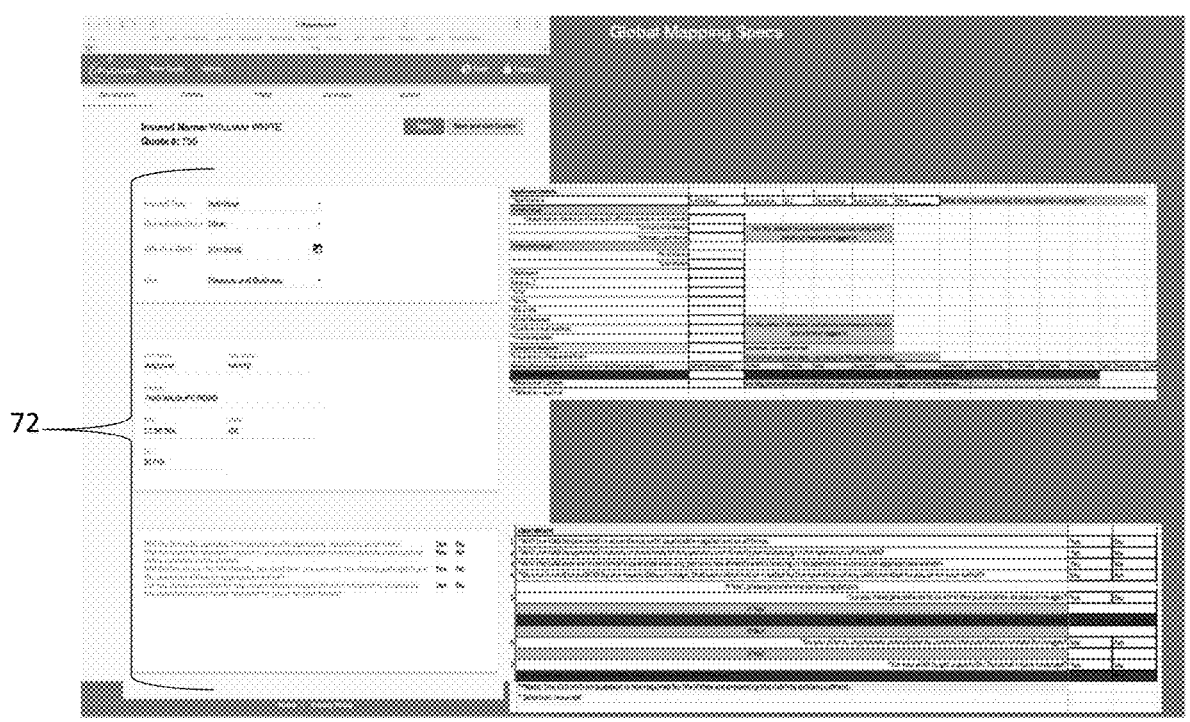
FIG. 7 is an example of an input screen for information about other factors which may affect the estimate for drone/UAS insurance.

FIG. 7 is an example of an input screen for information about other factors which may affect the premium for drone/UAS insurance. More specifically, this figure shows an example of the step 216 in the method of quoting multiple drone/UAS submissions. In this step, in this embodiment, the user submits general information 72, effective dates, drone use/etc. The general information 72, in some embodiments, include the input data listed in the steps above.

Figure 8:
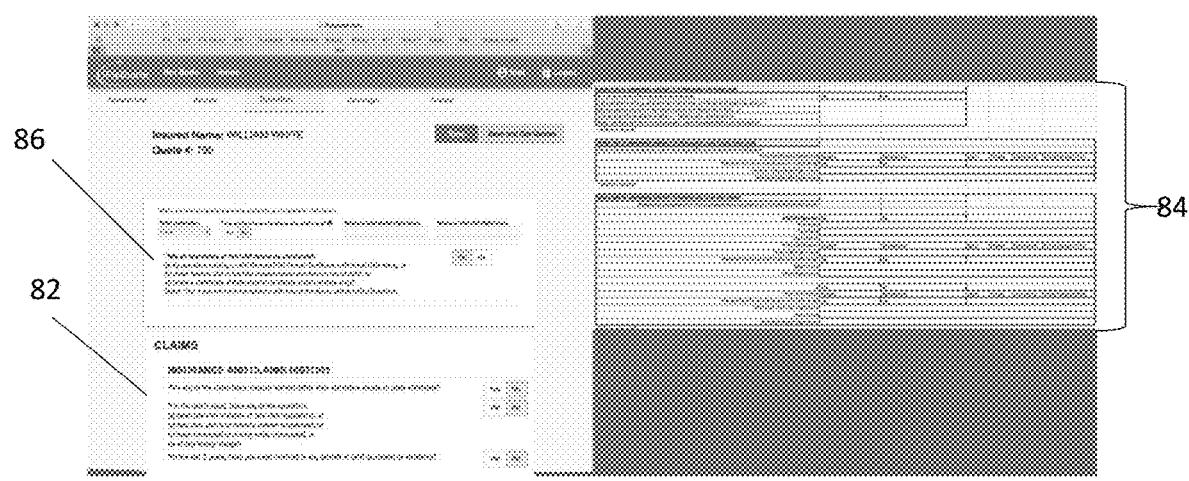
FIG. 8 is an example of an input screen for information about other factors which may affect the premium for drone/UAS insurance.

FIG. 8 is an example of an input screen for information about other factors which may affect the premium for drone/UAS insurance. More specifically, FIG. 8 is a further example of step 216, in this embodiment, in the drone/UAV quoting process and includes operator information instead of pilot information used in the examples above. More specifically, information regarding operators of the Drones/UAV's 86, aircraft information, claims history 82, and questions 84.

Figure 9:
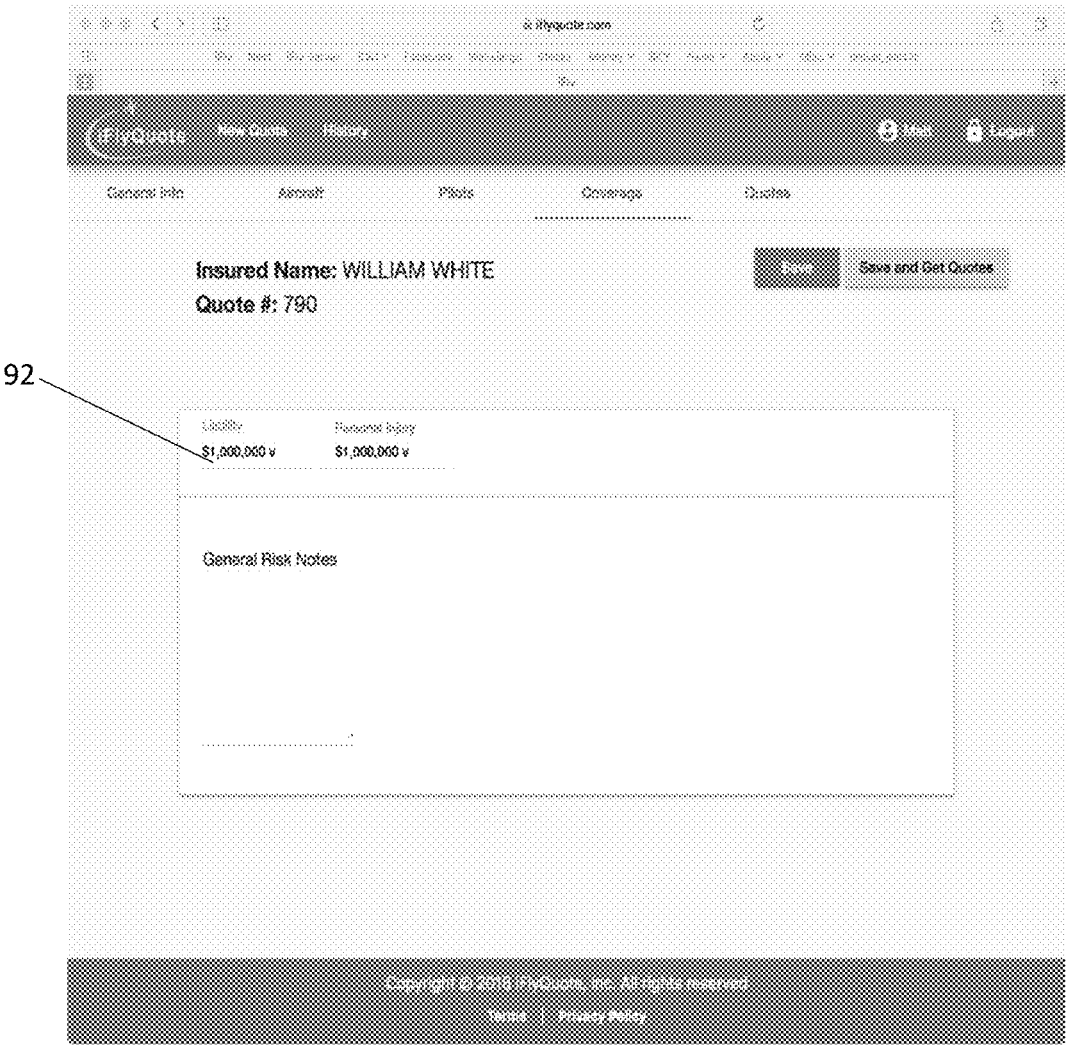
FIG. 9 is an example of an input screen for information about other factors which may affect the premium for drone/UAS insurance.

FIG. 9 is an example of an input screen for information about other factors which may affect the premium for drone/UAS insurance. FIG. 9 shows, in one embodiment, step 216 user input data including coverage, allowing the user to choose and select liability and other coverage options 92.

Figure 10:
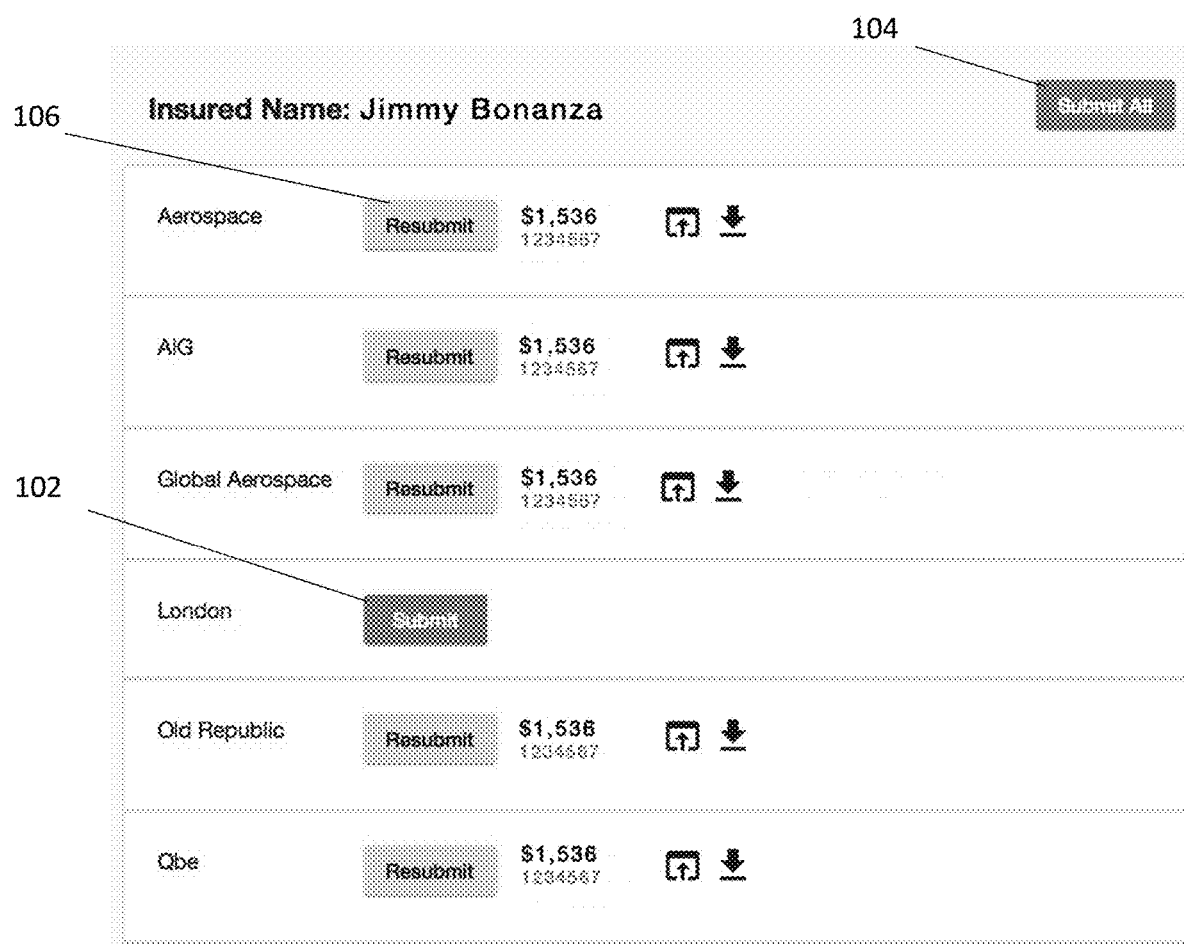
FIG. 10 is an example of an input screen for selecting aviation insurance vendors.

FIG. 10 is an example of an input screen for selecting aviation insurance vendors. FIG. 10 shows a further example of the type of input data collected and step 216 by the user, whereby the method allows the user to choose aviation insurance vendors. FIG. 10 is an example of the quoting screen allowing the user to select one or more insurance vendors to submit estimate request for drone/UAS insurance. In this embodiment, the user may submit to multiple insurance vendors at once by pressing the submit all button 104 (step 220) and return premiums and quote PDFs (step 222). Additionally, in this embodiment the user may submit an estimate request to each insurance vendor individually by using the submit button 102. Additionally, a user may resubmit a request for an insurance estimate by using the resubmit button 106.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or additional freely propagating electromagnetic waves, electromagnetic waves propagating through a waveguide or additional transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In additional embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, special purpose computer, or additional programmable data processing apparatus to produce a machine, such that the instructions, which execute via the processor of the computer or additional programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/ or additional devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, additional programmable data processing apparatus, or additional device to cause a series of operational steps to be performed on the computer, additional programmable apparatus or additional device to produce a computer implemented process, such that the instructions which execute on the computer, additional programmable apparatus, or additional device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or table of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A computer-implemented method for providing a user with an aviation insurance premium estimate for an aircraft respectively, on user interaction with one or more insurance vendor third-party server systems, comprising steps of:
    maintaining by a first server system having a first database, the first database storing an aviation insurance estimate program;
    receiving historical user aircraft query data from one or more previous users on one or more computing devices in a first format received;
    training a model based on the historical user aircraft query data to generate predictive model data for future searches, wherein the training at least including applying the historical user aircraft query data to the predictive model data to future collected aircraft identification data;
    extracting user aircraft query data from a current user on the one or more computing devices in the first format from an uploaded file to populate one or more fields;
    determining specific condition input screens and estimate requirements that are needed in order to receive the aviation insurance premium estimate based one or more determined estimate requirements;
    presenting the specific condition input screens with the estimate requirements on the one or more computing devices;
    determining if the user aircraft query data has enough information to apply the predictive model data;
    applying the predictive model data to complete the user aircraft query data to create realized user aircraft query data;
    initiating a third-party information request to a national aviation authority database for aircraft data for the aircraft associated with the user aircraft query data to correctly match the user aircraft query data;
    retrieve unknown aircraft query data from the national aviation authority database and populate missing fields on the specific condition input screens;
    presenting at a display on the one or more computing devices, fully realized user aircraft query data for confirmation by the current user;
    converting the fully realized user aircraft query data to a suitable format for each individual aviation insurance vendor third-party server system of a plurality of aviation insurance vendor third-party server systems;
    transmitting the fully realized user aircraft query data to the plurality of aviation insurance vendor third-party server systems;
    receiving the aviation insurance premium estimate received from the plurality of aviation insurance vendor third-party server systems; and
    presenting at the display of the one or more computing devices, the aviation insurance premium estimate from the plurality of aviation insurance vendor third-party server systems.

2. The computer-implemented method of claim 1, wherein the suitable format is a specific xml format.

3. The computer-implemented method of claim 2, wherein the user aircraft query data from the current user on the one or more computing devices is an aircraft's N number.

4. The computer-implemented method of claim 1 further comprising:
    initiating a second third-party information request to a FAA airmen database for pilot data for a pilot associated with the user aircraft query data to correctly match the user aircraft query data; and retrieving unknown pilot data from the FAA airmen database and populating the missing fields on the specific condition input screens.

5. The computer-implemented method of claim 4, wherein the unknown pilot data includes type of flight certificate held by the pilot, pilot ratings, pilot history of losses, waivers, violations, total hours, retractable landing gear certified credentials, multi-engine certified credentials, and tailwheel certified credentials.

6. The computer-implemented method of claim 1 wherein the uploaded file is an excel spreadsheet.

7. The computer-implemented method of claim 1, further comprising:

automatically crowdfunding across multiple brokerages for the plurality of aviation insurance vendor third-party server systems.

\* \* \* \* \*